Jan. 12, 1965
J. G. KAY ETAL
3,165,198
CONVEYOR
Filed Oct. 21, 1963
5 Sheets-Sheet 1
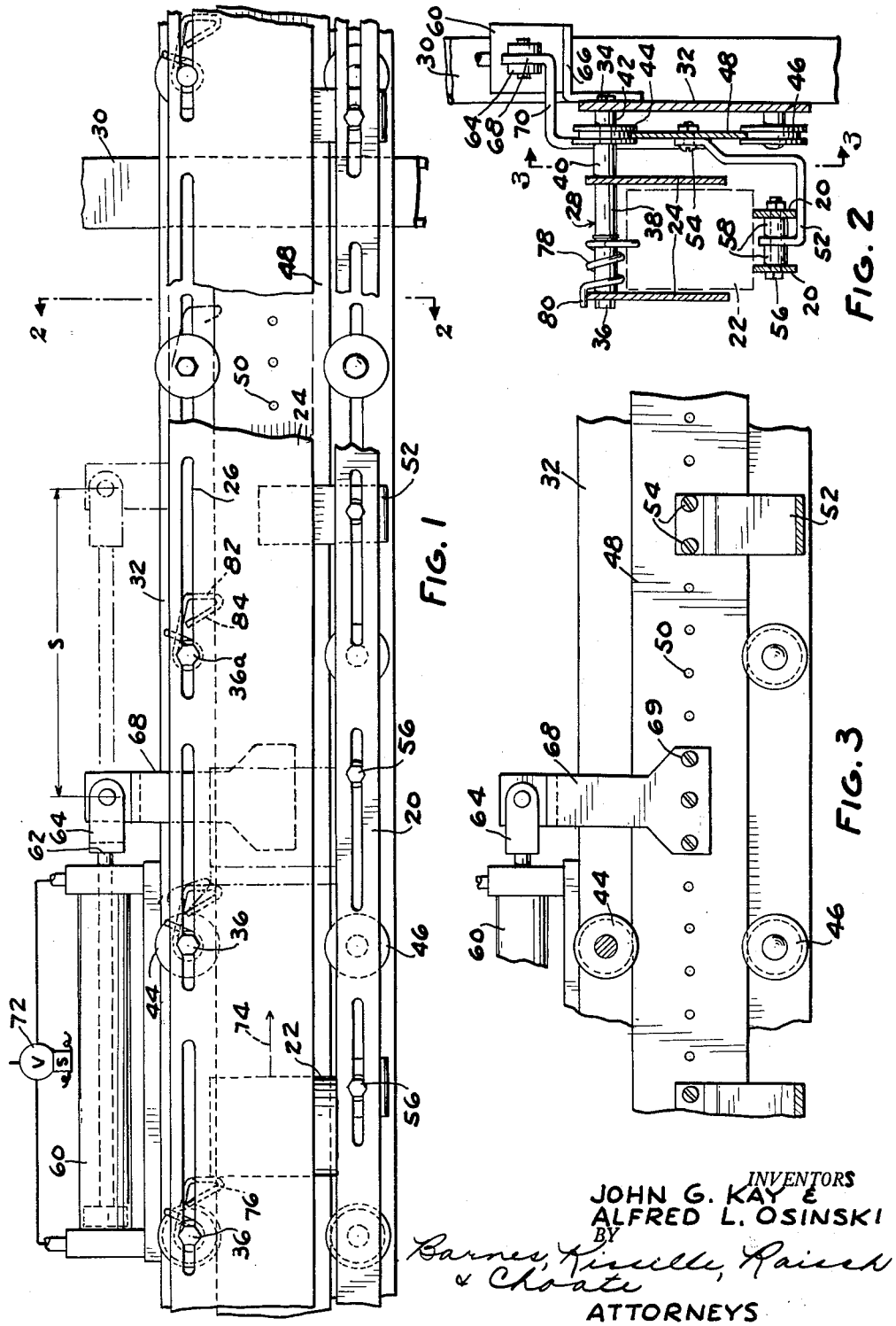
INVENTORS
JOHN G. KAY &
ALFRED L. OSINSKI
BY
Barnes, Kisselle, Raisch
& Choate
ATTORNEYS Jan. 12, 1965  J. G. KAY ETAL  3,165,198
CONVEYOR
Filed Oct. 21, 1963  5 Sheets-Sheet 2
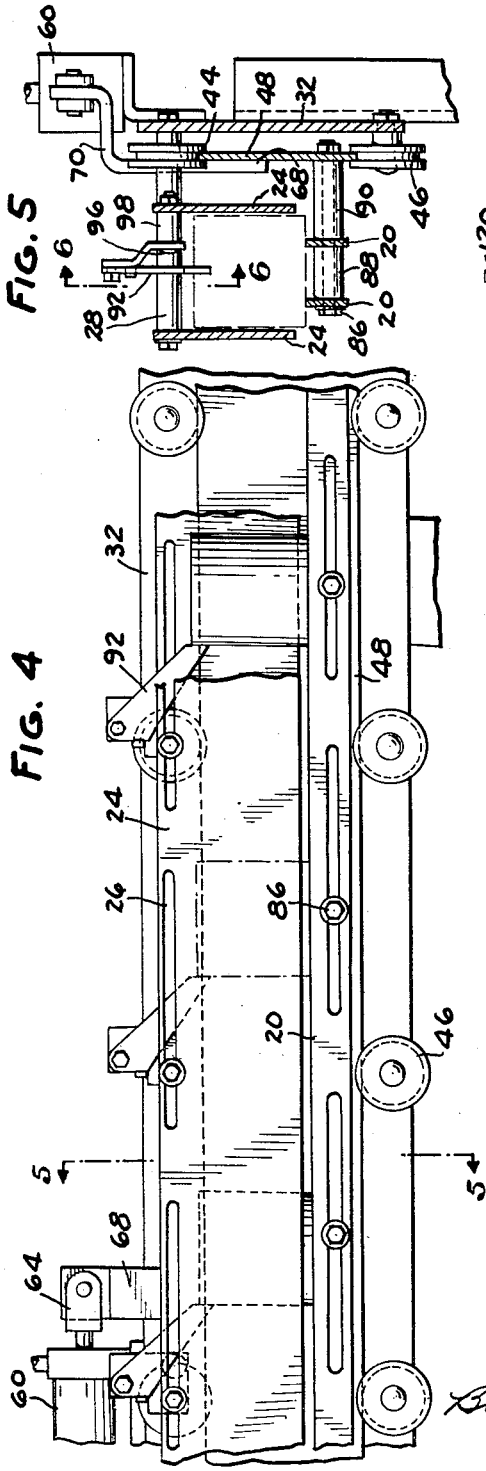
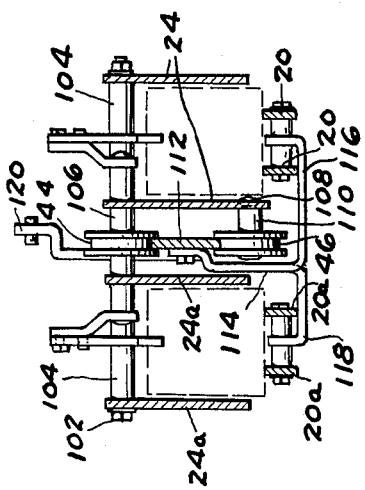
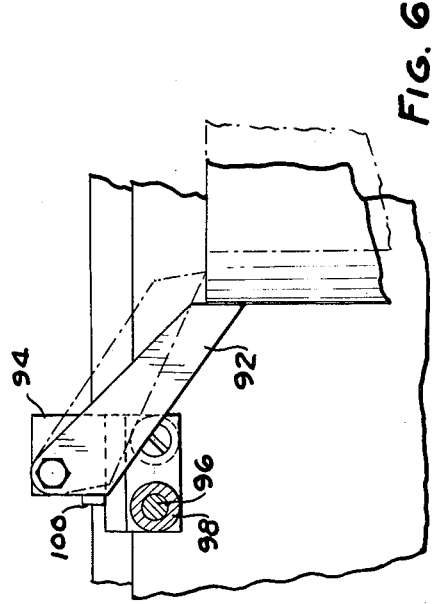
INVENTORS
JOHN G. KAY &
ALFRED L. OSINSKI
BY
*Barnes, Kisselle, Raisch*
*& Choate*
ATTORNEYS Jan. 12, 1965   J. G. KAY ETAL   3,165,198
CONVEYOR
Filed Oct. 21, 1963   5 Sheets-Sheet 3
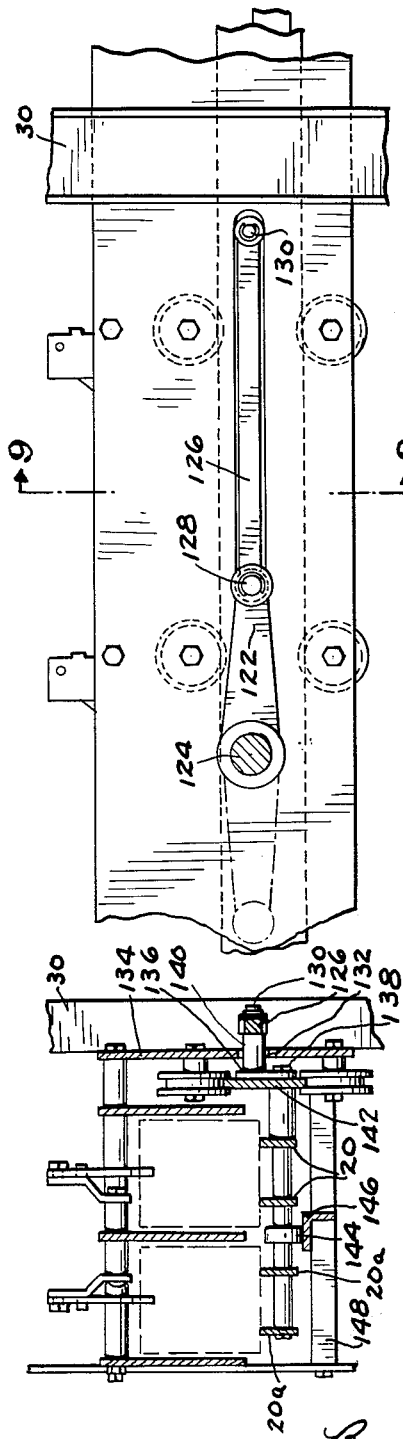
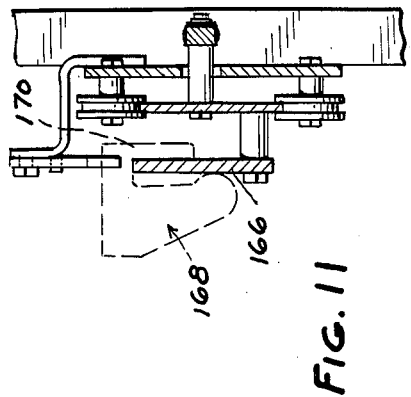
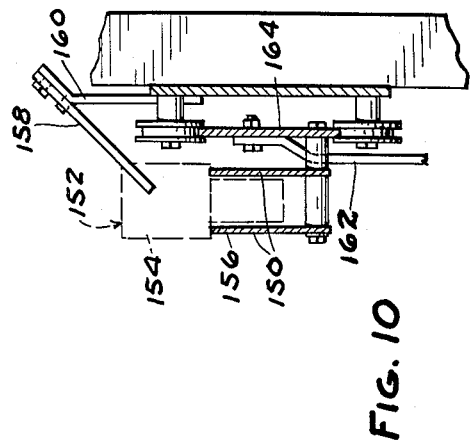
INVENTORS
JOHN G. KAY &
ALFRED L. OSINSKI
BY
Barnes, Kisselle, Raisch & Choate
ATTORNEYS

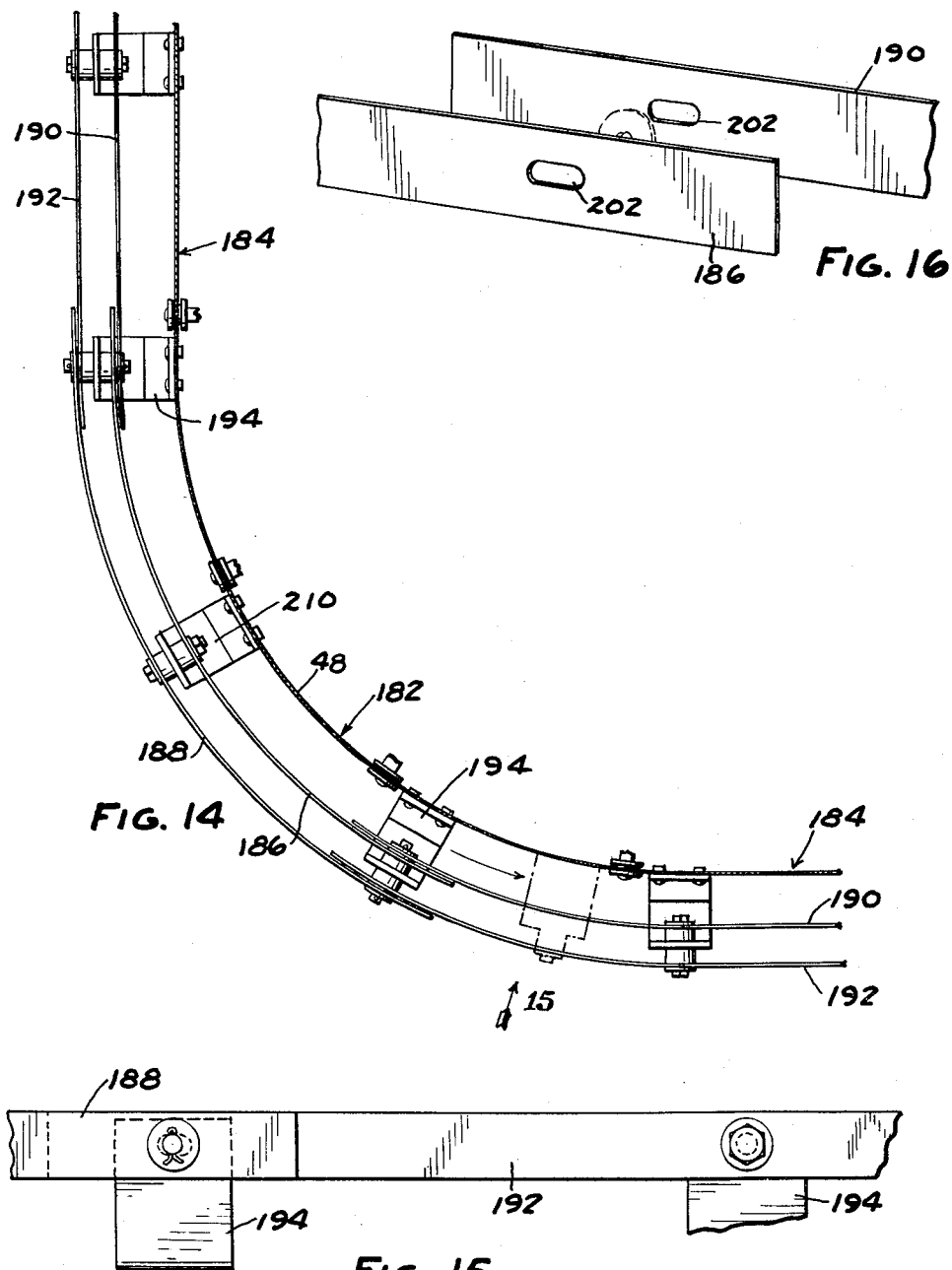

United States Patent Office 3,165,198
Patented Jan. 12, 1965

3,165,198
CONVEYOR
John G. Kay, Detroit, and Alfred L. Osinski, Warren,
Mich., assignors to F. Jos. Lamb Company, Warren,
Mich., a corporation of Michigan
Filed Oct. 21, 1963, Ser. No. 317,636
22 Claims. (Cl. 198—227)

This invention relates to conveyors and more particularly to conveyors of the type provided with means for advancing work pieces with a step-by-step movement.

It is an object of this invention to provide a conveyor of the type described that is adapted for conveying a variety of different work pieces in either a straight or a curved path.

A further object of the invention resides in the provision of a conveyor that is compact in size and which may be economically constructed.

Another object of the invention resides in the provision of a conveyor which includes one or more work supporting or carrier rails that is reciprocated by means of a power-driven transfer rail which extends continuously along the conveyor and is guided for reciprocating movement in a path parallel to the reciprocating path of the work supporting or carrier rail.

Other objects and features of the invention will become apparent from the accompanying description and drawings, in which:

FIG. 1 is a fragmentary side elevational view with portions broken away of one form of conveyor according to the present invention.

FIG. 2 is a sectional view along the line 2—2 in FIG. 1.

FIG. 3 is a sectional view along the line 3—3 in FIG. 2.

FIG. 4 is a view similar to FIG. 1 and showing a second form of conveyor according to the present invention.

FIG. 5 is a sectional view taken along the line 5—5 in FIG. 4.

FIG. 6 is a sectional view taken along the line 6—6 in FIG. 5.

FIG. 7 is a transverse sectional view of another embodiment of a conveyor according to the present invention.

FIG. 8 is a fragmentary side elevational view of a modified form of reciprocating drive for another embodiment of a conveyor according to the present invention.

FIG. 9 is a sectional view along the line 9—9 in FIG. 8.

FIGS. 10 and 11 are fragmentary sectional views of two additional embodiments of conveyors according to the present invention.

FIG. 14 is a sectional view taken along the line 14—14 in FIG. 13.

FIG. 15 is a fragmentary side elevational view of a portion of the structure shown in FIG. 14 as viewed in the direction of the arrow 15 in FIG. 14.

FIG. 16 is a fragmentary perspective view of the junction between successive carrier rails shown in FIGS. 13, 14 and 15.

Figure 12:
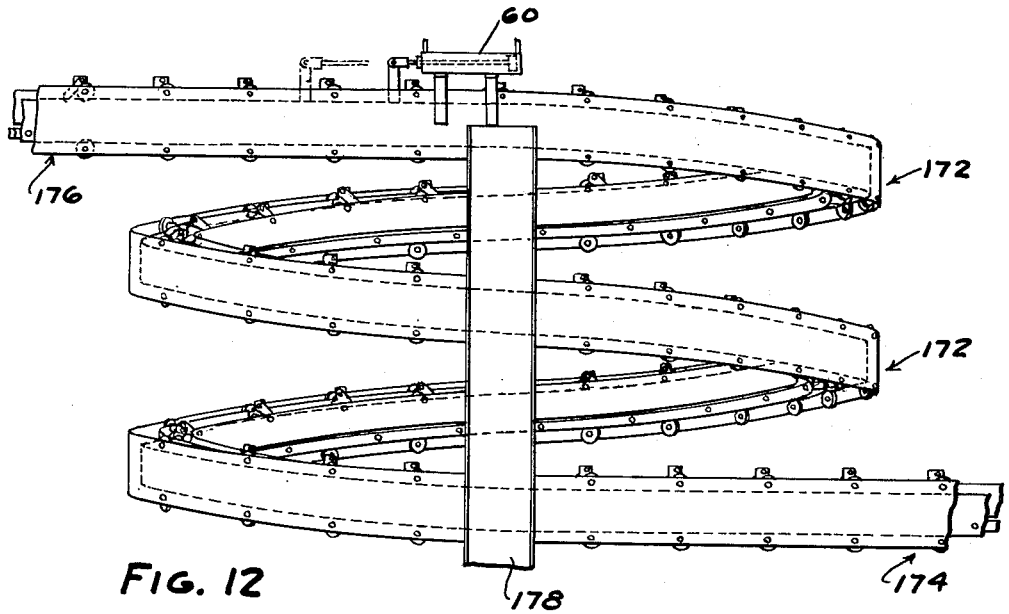
FIG. 12 is a fragmentary side elevational view of a conveyor according to the present invention constructed as a helical storage unit.
Figure 13:
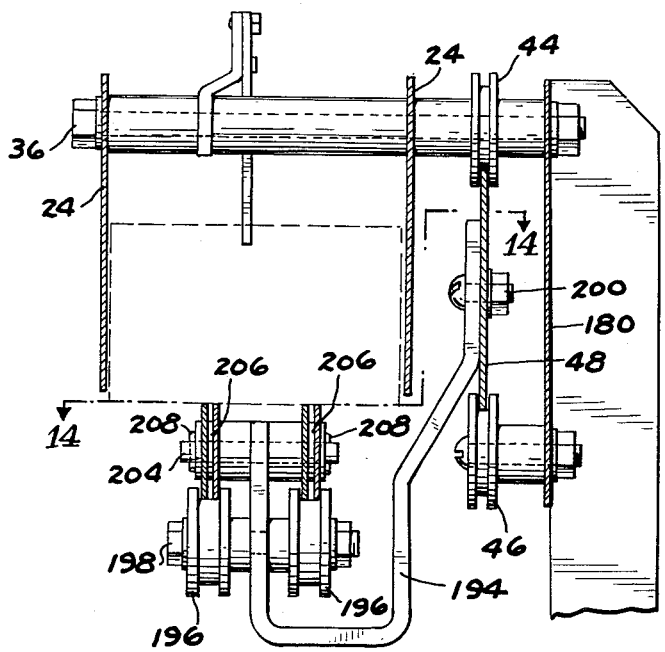
FIG. 13 is a fragmentary transverse sectional view of the type of conveyor shown in FIG. 12.

Referring first to FIGS. 1 through 3, the conveyor of the present invention includes a pair of carrier rails 20 on which work pieces such as indicated at 22 are adapted to be supported and a pair of guide rails 24 for guiding the work pieces 22 that are supported on carrier rails 20. Guide rails 24 are provided adjacent their upper edges with longitudinally extending slots 26 for accommodating studs 28 by means of which the guide rails are supported on a frame structure, an upright support member of which is indicated at 30. Although only one support member 30 is illustrated, it will be appreciated that a plurality of such upright supports are located along the extent of the conveyor. For reasons which will become apparent presently, the support members 30 need be located along only one side of the conveyor. A support plate 32 in the form of a flat metal strip is rigidly mounted on the successive upright support members 30 and the studs 28 have one end thereof fixedly secured to support plate 32 as at 34. Supporting studs 28 are actually long screws 36 having spacer sleeves or bushings 38, 40 and 42 thereon. Spacer sleeves 38 extend between the two guide rails 24. Spacers 40 extend between the inner guide rail 24 and upper guide rollers 44 while spacers 42 extend between guide rollers 44 and support plates 32. A lower set of guide rollers 46 are also mounted on support plate 32 and are spaced vertically below and in alignment with the upper guide rollers 44. The upper and lower guide rollers 44 and 46, respectively, form a track for receiving therebetween a transfer rail 48. Rail 48, as is clearly shown in FIG. 2, is positioned upright and lies in a plane parallel to the vertical planes of rails 20 and 24 with its upper and lower edges engaged by rollers 44 and 46. Rail 48 is fashioned with a series of longitudinally spaced holes 50 by means of which J-shaped support brackets 52 are mounted on transfer rail 48 as by screws 54.

The lower ends of support brackets 52 support carrier rails 20 as by screws 56 extending transversely through rails 20 and brackets 52 with spacer bushings 58 for fixedly retaining the lower ends of each bracket 52 spaced medially between carrier rails 20.

The drive mechanism for reciprocating transfer rail 48 is best illustrated in FIGS. 1 and 3 wherein it will be observed that an air cylinder 60 has a piston rod 62 provided with a clevis 64 at its outer end. Cylinder 60 is mounted along the upper edge of support plate 32 by means of an angle member 66. Clevis 64 is interconnected with transfer rail 48 by means of a rigid link 68. Link 68 is connected to transfer rail 48 by screws 69 in holes 50. It will be observed that cylinder 60 is located at one side of the conveyor and the link 68 has a laterally offset portion 70 to accommodate for the lateral spacing between clevis 64 and transfer rail 48. Cylinder 60 is connected with a source of air under pressure which is not illustrated through a solenoid valve 72 so that air is admitted first to one end of cylinder 60 and then to the other end so as to reciprocate transfer rail 48 and consequently carrier rails 20. In the embodiment illustrated in FIGS. 1 through 3, the stroke of piston rod 62 is designated S; and therefore, the screw 36a which is transversed by link 68 terminates at the inner guide rail 24 rather than extending through to support plate 32.

It will be appreciated that with the arrangement illustrated, when air under pressure is admitted alternately to opposite ends of cylinder 60, carrier rails 20 will be caused to reciprocate. As is illustrated, the direction of advance of the work pieces is designated by the arrow 74 and therefore, when carrier rails 20 advance in this direction, the work pieces resting on rails 20 are advanced in this direction a distance corresponding to the stroke of piston rod 62. Retrograde movement of work pieces 22 is prevented by means of dogs 76 pivotally supported on screws 36. The dogs 76 illustrated in FIGS. 1 through 3 are each in the form of a wire having a spiral portion 78 which encircles spacer 38, a laterally extending end portion 80 adapted to engage and rest on the upper edge of the outer guide rail 24 and a depending portion 82 terminating in an upwardly and rearwardly inclined end portion 84. The dogs 76 are thus fashioned such that when the carrier rails 20 advance the work pieces in a forward direction, as one of the work pieces encounters one of the dogs, the dog is pivoted upwardly (counterclockwise as viewed in FIG. 1) so as to bypass the work piece by reason of engagement of the leading edge of the work piece with the inclined portion 84 of the dog and after the work piece has passed the dog, the dog will then pivot downwardly (clockwise) to a position wherein the lateral projecting end 80 engages the upper edge of rail 24. Thereafter, when the rails 20 retract on the return stroke of piston 62, the depending portion 82 of the dogs will abut against the trailing edges of the work pieces and hold the work pieces stationary while the carrier rails 20 continue on the retraction stroke. In this manner, the work pieces are advanced step by step along the runway formed by rails 20 and 24. It will be noted that if the work pieces become stacked on rails 20, for example, an accumulation of work pieces at the discharge end of the conveyor; there will be no jamming because rails 20 will simply slide beneath the row of accumulated work pieces.

It will be appreciated that the spacing between successive dogs 76 is slightly less than the stroke S of piston rod 62. It should also be appreciated that although the dogs 76 are shown pivotally supported on the screws 36 by means of which the guide rails 24 and guide rollers 44 are mounted on support plate 32, the dogs 76 could be supported by means other than the screws 36. Likewise, it will be appreciated that it is not essential that the rollers 44 and the guide plates 24 be mounted on the support plate 32 by the same screws.

The embodiment shown in FIGS. 4 through 6 is very similar to that shown in FIGS. 1 through 3 but does embody minor variations. In the conveyor illustrated in FIGS. 4 through 6, guide rails 20 are mounted on transfer rail 48 directly by means of screws 86 rather than by an intermediate bracket such as shown at 52 in the previous embodiment described. Between rails 20, there is arranged on screws 86 spacer bushings 88 and between the inner rail 20 and the transfer rail 48, there are arranged on screws 86 spacer bushings 90. Likewise, dogs 92 are in the form of plates pivotally supported on inner rail 24 by means of brackets 94 mounted on the inner rails 24 by screws 96 and spacers 98. Dogs 92 are, like dogs 76, disposed generally centrally between guide rails 24 and are designed to bypass advancing work pieces and hold the work pieces against retrograde movement in the manner illustrated in FIG. 6. Dogs 92 are prevented from pivoting downwardly in a clockwise direction from the solid line portion shown in FIG. 6 by abutting against stops 100 on brackets 94. In other respects, the conveyor shown in FIGS. 4 through 6 is generally the same in construction and operation as that illustrated in FIGS. 1 through 3.

In FIG. 7, there is illustrated one form of double-lane conveyor according to the present invention. In this form of conveyor, the rail structure is supported along either one side of the chuting or at the central portion thereof. In any event, the two sets of guide rails 24 and 24a are supported on long screws 102 and are held in spaced apart relation by means of spacers 104 and 106. Screws 102 also support the upper guide rollers 44. The lower guide rollers 46 are supported from the inner guide rail 24 by means of screws 108 and spacers 110. The two sets of carrier rails 20 and 20a are supported from transfer rail 112 by means of sheet metal brackets 114 which have one portion 116 extending laterally in one direction to support carrier rails 20 and another portion 118 extending laterally in the opposite direction to support carrier rails 20a. The cylinder 60 shown in FIGS. 1 through 3 or any other suitable drive mechanism may be employed for reciprocating the transfer rail 112. The connecting rod of the cylinder or the reciprocating member of the drive mechanism, as the case may be, is connected to transfer rail 112 by means of a rigid link 120.

In FIGS. 8 and 9, there is illustrated a conveyor according to this invention employing a drive mechanism in the form of a crank. The crank is designated 122 and is mounted on the shaft 124 of a motor driven speed reducer, not illustrated. A link 126 has one end connected to the free end of crank 122 as at 128. The other end of link 126 has a pin 130 mounted thereon, the pin extending transversely through an elongated slot 132 in the mounting plate 134 by means of which the rail assembly is mounted on the support member 30. The inner end of pin 130 is connected to a link 136 mounted on a long screw 138. A spacer bushing 140 surrounds screw 130 between link 136 and crank 126. The two sets of carrier rails 20 and 20a, respectively, are supported on the long screws 138. These screws also extend through the transfer rail 142. Between the two sets of carrier rails 20 and 20a, there is arranged on screws 138 rollers 144 which are adapted to ride on an angle member 146 positioned intermediate the two lanes of the conveyor and supported on the support plate 134 by transverse rods 148. Rollers 144 provide additional vertical support to the cantilever supported carrier rail structure.

While the previous embodiments illustrate the use of at least two carrier rails 20 and two guide rails 24, it is not essential that such carrier rails and guide rails be employed in all instances. The necessity for guide rails and the number of carrier rails required will be determined by the size and shape of the work piece being conveyed. For example, in FIG. 10, there is illustrated an arrangement embodying two carrier rails 150 and no guide rails. Such an arrangement may be employed in the case of work pieces such as shown at 152 having a body portion 154 adapted to be supported on carrier rails 150 and a depending extension 156 of lesser transverse dimension than body portion 154 so as to fit between the carrier rails 150. In the arrangement shown in FIG. 10, the carrier rails 150 may have a vertical dimension greater than the carrier rails 20 and 20a previously described, depending upon the vertical dimension of the extension 156. With this arrangement, the dog 158 is pivotally supported on a bracket 160 in an inclined position so that the lower end of the dog is adapted to engage the central portion of the work piece. FIG. 10 also illustrates the fact that the drive link 162 for reciprocating transfer rail 164 may extend downwardly to a drive mechanism positioned below the conveyor instead of above it as is illustrated in FIGS. 1 through 7.

In FIG. 11, there is illustrated a conveyor arrangement wherein a single carrier rail 166 is employed and no guide rails are necessary. This arrangement is suitable for work pieces such as shown at 168 having a hook portion 170 by means of which the work pieces can be hung over the upper edge of carrier rail 166.

FIGS. 12 through 16 illustrate conveyor constructions in accordance with the present invention wherein the conveyor is curved or at least has a curved portion. The conveyor arrangement shown in FIG. 12 is designed to form a helical storage unit or an elevator comprising a plurality of convolutions 172 having a generally straight inlet portion 174 at the lower end and a generally straight outlet portion 176 at the upper end. The convolutions are supported by a pair of upright supports, one of which is illustrated at 178. The backbone support for the conveyor comprises a sheet metal support plate 180 which is formed in a spiral and is rigidly connected to the upright supports 178. Support plate 180 extends continuously from the lower inlet end 174 to the upper outlet end 176 of the storage unit. The guide plates 24 are mounted on the support plate 180 by means of screws 36 in the manner illustrated and described with reference to FIG. 1. In this connection, it will be observed that the elongated slots 26 enable the guide rails 24 to be shaped to most any curvature desired and retained in such shape by tightening screws 36 which pass through transversely aligned openings in the two guide rails. The upper and lower guide rollers 44 and 46, respectively, are mounted on support plate 180 in the same manner as illustrated and described with reference to the embodiments of FIGS. 1 through 3. These rollers form a track for supporting the transfer rail 48. It will be appreciated that transfer rail 48 is parallel throughout its length to the plane of support plate 180. Thus, those portions of transfer rail 48 adjacent the convolutions 172 assume a curved shape and those portions of transfer rail 48 adjacent the straight inlet and outlet sections 174 and 176, respectively, are generally straight. Preferably, the support plate 180, transfer rail 48 and guide rails 24 are all formed from spring steel. Thus, the transfer rail 48 can flex as required as it reciprocates between the straight and curved portions of the conveyor. As in the embodiment disclosed in FIGS. 1 through 3, the means for reciprocating transfer rail 48 comprises an air cylinder 60.

It will be appreciated that in a conveyor of the type disclosed herein wherein a portion of the chuting is curved and an adjacent portion is straight, since the radius of curvature of the transfer rail is of a different length from the radii of curvature of the carrier rails, it is necessary to mount the carrier rails on the transfer rails so as to accommodate for the necessity of the rails having the greater radius of curvature to travel a greater linear distance than the rails having a lesser radius of curvature. To illustrate this feature of the present conveyor construction, there is shown in FIG. 14 a conveyor section which incorporates an intermediate curved portion 182 interconnected at each end to straight portions 184. The portion of the structure shown in FIG. 14 does not include support plate 180 nor guide rails 24. This is evident from the section line 14—14 in FIG. 13. In the arrangement illustrated in FIGS. 13 and 14, the carrier rails are arranged in sections. The curved portion 182 of the conveyor is provided with inner and outer carrier rails 186 and 188 while the straight portions 184 of the conveyor are provided with inner and outer carrier rails 190 and 192. It will be observed that the opposite ends of the curved carrier rails 186, 188 overlap the adjacent ends of carrier rails 190, 192. The manner in which these carrier rails are supported at their overlapping ends is clearly illustrated in FIG. 13. The supporting structure for the carrier rails at their overlapping ends includes 2 J-shaped brackets 194 on which support rollers 196 are journalled as by studs 198. Brackets 194 are mounted on the transfer rail 48 as by screws 200. Adjacent the ends of rails 186, 188, 190, 192, longitudinal slots 202 are formed. Pins 204 extending through slots 202 and also through brackets 194 loosely mount these rails on brackets 194. Support rollers 196 are mounted on brackets 194 so that they engage the lower edges of the carrier rails at the overlapping end portions thereof. Preferably, washers or spacers 206 are interposed between the overlapping ends of each pair of rails and cotter pins 208 are utilized for retaining the rails in loosely assembled position on brackets 194. Between their ends, carrier rails 186 and 188 are rigidly mounted on a single J-shaped bracket 210. With this arrangement, it will be observed that as the transfer rail 48 is reciprocated, the slots 202 permit the carrier rails 186 and 188 to slide longitudinally relative to each other and to the carrier rails 190 and 192. This compensates for the fact that the radius of curvature of each carrier rails is different from the radius of curvature of the transfer rail 48. At the same time, the loosely connected ends of the carrier rails are vertically supported by rollers 196 so that there is no tendency for them to sag under the weight of the work pieces being conveyed. It will be appreciated that the use of the slots 202 in combination with the pins 204 is one particular type of construction that may be adopted for slidably connecting in overlapping relation the ends of carrier rails which have different curvatures. Other means for slidably connecting these overlapping ends together are obviously within the scope of the present invention.

We claim:

1. A conveyor comprising a support, guide means on said support, a transfer rail supported by the guide means for lengthwise reciprocation on the support, a carrier rail spaced laterally from the transfer rail and extending parallel to the transfer rail, means extending transversely between the transfer rail and the carrier rail for supporting the carrier rail on the transfer rail for reciprocation therewith, said carrier rail having a generally straight upper edge adapted for slidably supporting work pieces to be conveyed, means for reciprocating the transfer rail and means on the support structure adjacent the carrier rail for engaging work pieces on the carrier rail and preventing retrograde movement thereof when the carrier rail moves in the retracting direction.

2. A conveyor as called for in claim 1 wherein the guide means comprises two sets of guide rollers which are spaced apart vertically to receive the transfer rail therebetween.

3. A conveyor as called for in claim 2 wherein the transfer rail comprises a sheet metal strip disposed in a generally vertical plane and having its upper and lower edges engaged by the two sets of guide rollers.

4. A conveyor as called for in claim 1 wherein the transfer rail is formed of a strip of resiliently flexible sheet metal and is supported by said guide means at one portion thereof for reciprocation in a curved path and at an adjacent portion for reciprocation in a generally straight path whereby the transfer rail flexes as it reciprocates along said curved and straight paths.

5. A conveyor as called for in claim 1 wherein said means extending transversely between the transfer rail and the carrier rail comprise horizontally extending pins secured at one end to the transfer rail and at the other end to the carrier rail.

6. A conveyor as called for in claim 1 wherein said means extending transversely between said transfer rail and carrier rail comprise generally J-shaped support brackets having their upper ends connected to the transfer rail and their lower ends connected to the carrier rail.

7. A conveyor as called for in claim 1 including a pair of guide rails extending generally parallel to the carrier rail and projecting above the upper edge of the carrier rail and means on said support structure supporting said guide rails one at each side of said carrier rail.

8. A conveyor comprising a support, guide means on the support forming a track which, in a horizontal plane, has two portions of different curvature, a resiliently flexible transfer rail engaged with said guide means for reciprocation along said track, means for reciprocating said transfer rail whereby the interengagement of the guide means and the transfer rail causes the transfer rail to flex when reciprocated, a carrier rail spaced laterally of said transfer rail and generally parallel therewith, said carrier rail comprising at least two sections each of which is connected with the transfer rail to be reciprocated thereby in response to reciprocation of the transfer rail, the adjacent ends of said carrier rail sections being interconnected for relative longitudinal sliding movement, means for reciprocating said transfer rail and means on said support for preventing retrograde movement of work pieces on the carrier rail when the carrier rail moves in the retracting direction.

9. A conveyor as called for in claim 8 wherein the two carrier rail sections are supported at least in part by said transfer rail.

10. A conveyor as called for in claim 8 wherein the adjacent ends of said carrier rail sections are in overlapping relation and including means slidably connecting said ends together.

11. A conveyor as called for in claim 8 wherein the adjacent ends of said carrier rail sections are in overlapping relation and are provided with registering openings therein and a pin passing through said registering openings and loosely connecting said overlapping ends together, said openings having a dimension lengthwise of said rail sections greater than the pin whereby when the carrier rail sections flex as they traverse said two portions of different curvature, the ends of said carrier rail sections are free to slide longitudinally relative to one another.

12. A conveyor as called for in claim 8 including means slidably supporting the slidably connected ends of said carrier rail sections.

13. A conveyor as called for in claim 8 including means on and movable with the transfer rail slidably supporting the slidably connected ends of said carrier rail sections.

14. A conveyor as called for in claim 13 wherein said last mentioned means comprises a bracket structure on the transfer rail having one portion thereof supporting said carrier rail sections and having guide rollers thereon adapted to vertically support the overlapping ends of the carrier rail sections.

15. A conveyor comprising a fixed support, two sets of guide rollers mounted on said support in vertically spaced relation, a generally vertically disposed transfer rail, said transfer rail having generally straight parallel upper and lower edges engaged respectively by said two sets of guide rollers whereby the guide rollers are adapted to guide said transfer rail for lengthwise reciprocation, means for reciprocating the transfer rail, a carrier rail spaced laterally from and generally parallel to said transfer rail, means extending transversely between the transfer rail and the carrier rail for reciprocating the carrier rail in response to reciprocation of the transfer rail, means spaced along said support and projecting toward said carrier rail for engaging work pieces on the carrier rail and holding said work pieces against retrograde movement when the carrier rail moves in the retracting direction.

16. A conveyor comprising a sheet metal support strip extending lengthwise in a generally horizontal direction, means supporting said support strip such that the plane thereof is generally vertical, said support strip having two sets of guide rollers thereon, said guide rollers comprising an upper set and a lower set spaced uniformly apart and aligned vertically in the same plane, said guide rollers being mounted on said support strip for rotation about horizontal axes, a transfer rail comprising a second sheet metal strip disposed vertically between said rollers and guided thereby for reciprocation in a direction lengthwise of and generally parallel to said support strip, a plurality of supports secured to the transfer rail and spaced along the length thereof, said supports extending laterally of the transfer rail, carrier rail means spaced laterally from the transfer rail and supported on said supports for reciprocation in unison with the transfer rail, said carrier rail means extending generally parallel to said transfer rail and being adapted to support work pieces resting thereon and to advance the work pieces in response to reciprocation of the transfer rail.

17. A conveyor as called for in claim 16 wherein said supports extend laterally on opposite sides of the transfer rail and said carrier rail means comprise at least two carrier rails supported one at each side of the tranfer rail.

18. A conveyor as called for in claim 16 including a plurality of supports on said support strip spaced lengthwise thereof and extending laterally thereof and guide rail means mounted on said last mentioned supports, said guide rail means being generally parallel to and laterally offset from the carrier rail means.

19. A conveyor as called for in claim 18 wherein the last mentioned supports are located above the first mentioned supports and said guide rail means extend vertically upwardly beyond the carrier rail means.

20. A conveyor as called for in claim 18 wherein the carrier rail means and the guide rail means comprise sheet metal strips disposed in parallel vertical planes.

21. A conveyor as called for in claim 20 wherein said support strip has at least two axially adjacent portions of different radii of curvature.

22. A conveyor as called for in claim 20 wherein said support strip is fashioned as a helix.

References Cited in the file of this patent
UNITED STATES PATENTS
1,167,216    Rathsfeld _____ Jan. 4, 1916